Figure 1:
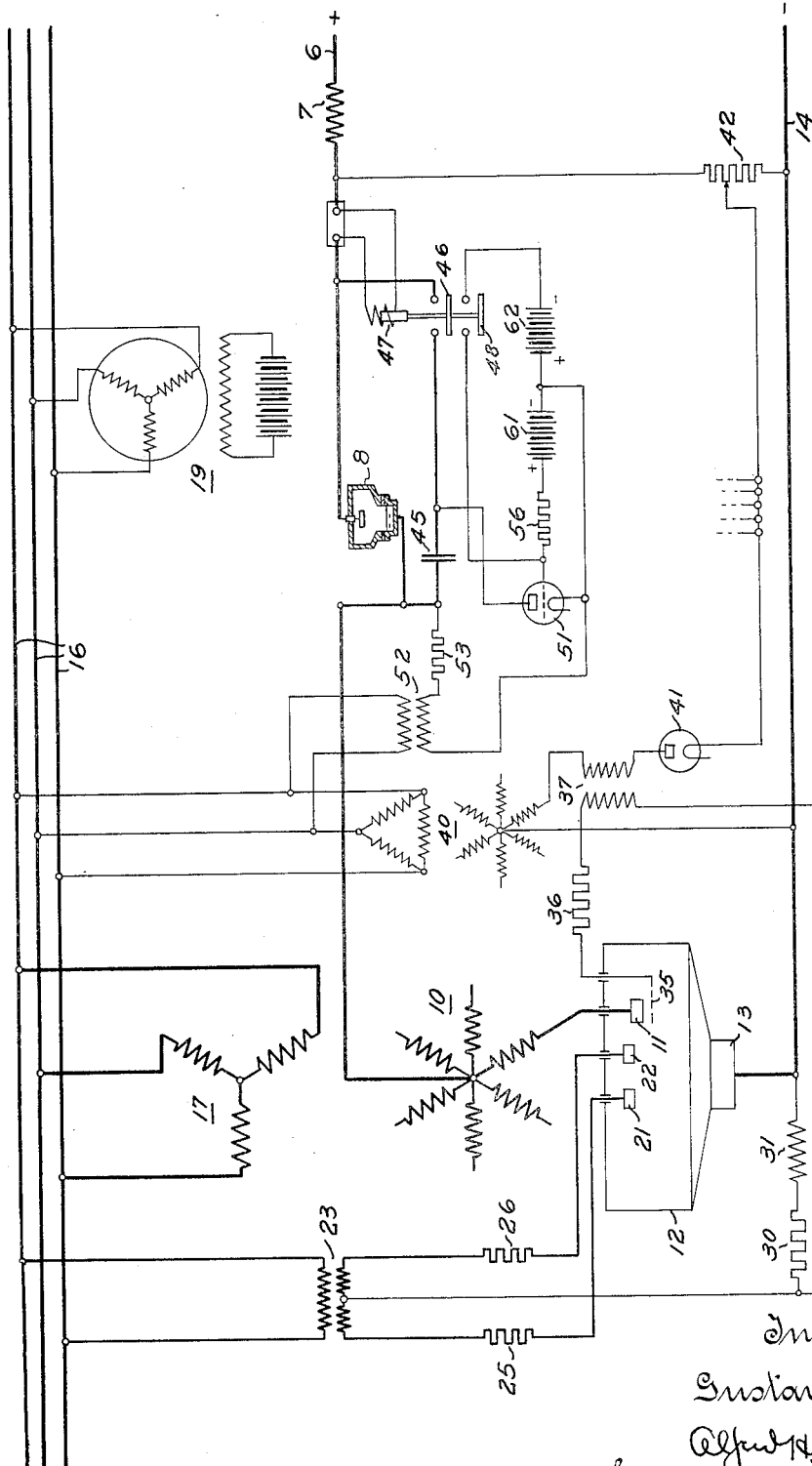

April 3, 1934. G. BRUNNER 1,953,464
ELECTRIC CURRENT RECTIFYING SYSTEM
Filed Sept. 19, 1931 2 Sheets-Sheet 2

Inventor
Gustav Brunner
by Alfred H. Dyson
Attorney

Patented Apr. 3, 1934

1,953,464

UNITED STATES PATENT OFFICE 1,953,464

ELECTRIC CURRENT RECTIFYING SYSTEM

Gustav Brunner, Baden, Switzerland, assignor to Aktiengesellschaft Brown Boveri et Cie., Baden, Switzerland, a joint-stock company of Switzerland Application September 19, 1931, Serial No. 563,723
In Germany September 2, 1930

14 Claims. (Cl. 175—363)

This invention relates to improvements in systems for inverting direct current to alternating current and particularly to such systems when an electric valve of the metallic vapor type is employed as the inverting means.

In the transmission of electric energy as high voltage direct current and the inversion of the same into polyphase alternating current by means of electrostatically controlled electric valves of the metallic vapor type, it is particularly necessary to provide for the quickest possible disconnection of overloads on the system or of short circuits on the alternating current side of the system. Due to the fact that the transformer connecting the valves to the alternating current side of the system is excited from the direct current line, a short circuit particularly, i. e. a dropping of the voltage on the secondary winding side of the transformer connecting the two portions of the system also causes a short circuit on the direct current side of the system. Such short circuits cannot be prevented by disconnection of the short circuited portion of the alternating current line by means of an oil switch because of the fact that such switches have much too great an inertia to operate with sufficient speed for the present purpose. It is extremely difficult, if not impossible at the present time, to construct a quick acting switch for the very high direct current voltages encountered in the direct current transmission of power. In addition to the above difficulties encountered in a system of the character described, disconnection of the direct current side of the system upon the occurrence of each short circuit on the alternating current side of the system would not be permissible for operating reasons and would be very disadvantageous due to the starting action required in such systems after each disconnection thereof especially when it is remembered that short circuits are apt to occur very frequently on the alternating current line.

The use of metallic vapor valves in which the arc flowing therethrough may be quenched by a condenser, as switches for high voltage direct current has already been proposed. Connection of the condenser for the purpose of quenching the arc in the valve may be controlled by a vapor filled discharge path which is blocked by a negatively charged grid at normal load on the system whereas, at abnormal loads or short circuits, a positive voltage of such amount is applied to this grid or discharge path from a current transformer, which is excited in dependence on the load on the system, that the condenser may be discharged. Such methods of interrupting a circuit are not, however, desirable because metallic vapor apparatus connected with a direct current voltage cannot be continuously blocked by a negatively charged grid. The use of electron tubes for high currents, instead of metallic vapor apparatus, requires a continuous heating of the tube cathode which results in a very short life for such tubes.

One means by which the operation of a metallic vapor valve may be controlled by a condenser capable of quenching the arc, without the use of an electron discharge tube, is by connecting the condenser in series with an auxiliary electrode arranged interiorly of the valve whereby the cathode of the valve may be momentarily made currentless. Such arrangement is particularly important as an over-current protection for systems in which high voltage direct current is inverted into polyphase alternating current by means of a controlled metallic vapor valve and a transformer. In such systems a short circuit on the alternating current side of the system also causes a short circuit on the direct current side of the system with its attendant danger of damage to the entire system. But such short circuit may be made entirely non-injurious by the use of condensers connected in parallel with the arc in the valve if means, such as an arcing relay which is electromagnetically controlled in dependence on the current and voltage of the direct current side of the system, is used instead of a quick acting switch for the purpose of connecting or disconnecting the condenser.

If an auxiliary electrode within the interior of the inverter is used in connection with the cathode for the purpose of connecting the condenser, the cathode spot on the metallic cathode is quenched by the discharge of the condenser from the cathode to the auxiliary cathode and such spot is produced on the auxiliary cathode where it is quenched after the condenser is discharged. Researches, have, however, shown that attachment of the arc on the auxiliary cathode does not always take place safely. It is, therefore, among the objects of the present invention to provide a system for inverting high voltage direct current into polyphase alternating current at any desired voltage.

Another object of the invention is to provide a system for inverting direct current into alternating current in which means are provided for protecting the system from abnormal conditions such as overloads or short circuits.

Another object of the invention is to provide an inverting system for changing direct current to alternating current in which an inverter of the metallic vapor type is used.

Another object of the invention is to provide a system for inverting direct current into alternating current in which an inverter of the metallic vapor type is controlled by a condenser.

Another object of the invention is to provide a system for inverting direct current into alternating current in which the arc flowing through an inverter of the metallic vapor type is quenched upon the discharge of a condenser which is electro-magnetically controlled.

Figure 2:
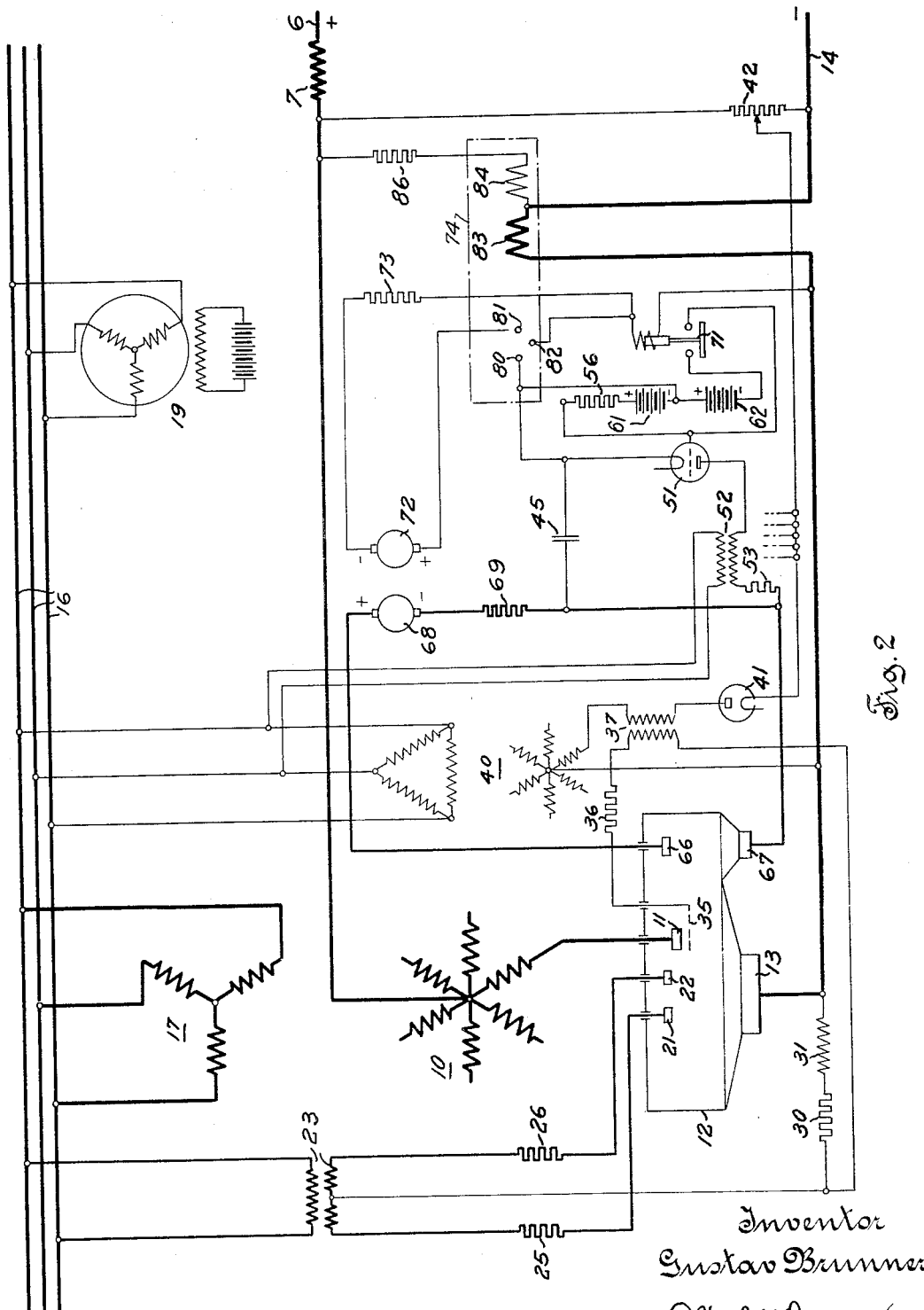

Objects and advantages, other than those above set forth, will be apparent from the following description when read in connection with the accompanying drawings in which:

Figure 1 diagrammatically illustrates one embodiment of the present invention in which an inverter of the metallic vapor type is employed to invert high voltage direct current into polyphase alternating current and which is controlled by the charging and discharging of a condenser connected with the inverter; and Fig. 2 illustrates a modification of the system shown in Fig. 1 in which an auxiliary electrode arranged interiorly of the inverter is utilized in connection with a condenser for the purpose of controlling the arc flowing within the inverter.

Referring now to the drawings by characters of reference the reference numeral 6 designates one bus bar of a high voltage direct current supply line which is connected through a reactance coil 7 and an electric valve 8 which may, preferably, be of the two electrode metallic vapor type, provided with an arc ignition device of any suitable well known type, and which becomes non-conductive upon occurrence of interruption of flow of current therethrough with the neutral point of the primary winding 10, which is connected in star, of a transformer. Each of the phases of the transformer winding 10 is connected with a main anode 11 of an electric current inverting device 12 of the metallic vapor type which is substantially the same as an electric current rectifier of the metal inclosed metallic vapor type known to the current rectifying art. The main anodes 11 are illustrated as being formed of a solid material whereas the cathode of the inverting device 12 is formed as a pool of mercury 13. The cathode 13 is connected with a bus bar 14 which forms the negative side of a direct current supply system or transmission line for high voltage transmission of power. It will be understood that throughout the entire disclosure of the present invention only such circuits are shown and described as are necessary to disclose the connections and operation of the system and that the such duplication of portions of the system as the plurality of the anodes of the inverter and the grid control therefor particularly has been omitted to render the drawings more readily understandable.

The inverting device 12 is connected with a multiphase alternating current line 16 through the secondary windings 17 of a transformer. A synchronous machine 19, which is preferably over-excited, is connected with the alternating current line 16 for the purpose of giving the proper wave shape and frequency to the current flowing in the line 16 which is utilized to supply electric power in the form of alternating polyphase current to any suitable consuming device whether the device be reactive or resistive.

It will be understood that the inverter 12 is provided with means for striking or starting an arc between the anodes 11 and the cathode 13 such as is well known in the electric current rectifying art and which is, therefore, not here shown. After the arc has been started by the ignition device (not shown) the arc is kept alive by the use of excitation anodes 21 and 22 which are supplied from the alternating current line 16 by means of a transformer 23 through loading resistances 25 and 26 connected in the leads between the secondary winding of the transformer 23 and the excitation anodes. The midpoint of the secondary winding of the transformer 23 is connected through a resistance 30 and a reactance 31 with the cathode 13 of the inverter 12 for the purpose of causing the excitation arcs to overlap as is usual in rectifying systems employing a rectifier similar to the inverter illustrated at 12.

The arc within the inverter 12 is controlled by means of grids 35 which are supplied with current through current limiting resistances 36 from the secondary windings of current transformers 37 which are connected with the cathode 13 of the inverter through the resistance 30 and the reactance 31. An alternating current is imposed on the grids 35 from the alternating current line 16 through a transformer 40, each phase of which is connected through the primary winding of a current transformer 37 and through a two electrode electric valve 41 to a valve resistance 42 connected across the direct current bus bars 6 and 14. The primary winding of the transformer 40 is connected in delta with the alternating current line 16 and the secondary winding of the transformer is connected in star with the neutral point of such winding connected with the direct current bus bar 14 to the cathode 13 of the inverting device.

When the system is operating normally i. e. with a normal load on both the direct current and the alternating current sides of the system, a flow of current takes place from the alternating current line 16 through the transformer 40, primary windings of transformers 37, the valves 41, and the resistance 42 to the direct current line 14 and back to the secondary winding neutral point of the transformer 40. Positive voltage impulses are thus given to the grids 35 through the current transformers 37. So long as a grid 35 is charged positively the arc will continue to flow from the associated main anode 11 to the cathode 13 and such arc cannot be interrupted by negative charging of the grid. Interruption of the arc is possible only by interruption of the direct current supply lines 6 and 14, but the arc may be kept away from any one of the main anodes 11 by negative charging of the associated one of the grids 35. Such action is well known and is employed in the voltage regulation of electric current rectifying systems employing a current rectifier similar to the inverting device shown. It will be understood that the direct current flowing into the inverting device 12 is converted into polyphase alternating current by the successive action of the main anodes 11 and is transmitted through the transformer 10, 17 to the alternating current line 16 in a reverse manner from that prevailing in an alternating current to direct current rectifying system employing a metallic vapor rectifier.

The valve 8 in the direct current line 6 is shunted by a condenser 45, the connection of which with the positive direct current bus bar 6, is controlled by the upper contacts 46 of a relay 47 provided with a pair of auxiliary contacts 48 the purpose of which will appear hereinafter. One terminal of the condenser 45 is connected with the cathode of the valve 8 and the other terminal of the condenser is connected, through the contacts 46 of the relay 47 with the direct current bus bar 6. Discharge of the condenser 45 will operate to quench the arc flowing through the inverter 12 as will be explained hereinafter.

The condenser 45 will operate more effectively if it is charged with a polarity opposite to that impressed thereon during extinction of the arc in the inverter 12. Such charge may be obtained by the use of a triode electric valve 51, the cathode of which is connected with one end of the secondary winding of a potential transformer 52 and having the other end of such winding connected with one terminal of the condenser, the other terminal of the condenser being connected to the anode of the valve 51. The grid of the valve 51 is connected through a load resistance 56 with a source of current such as a battery 61 from which the grid may be positively charged during at least a portion of the operation of the circuit as will be hereinafter explained. A second source of current such as the battery 62 is arranged to be capable of impressing a negative potential on the grid of the valve 51, upon lifting of the armature of the relay 47 to such extent that the lower contacts 48 of the relay may close the circuit. The purpose of the grid control circuit for the valve 51 is at least partially to prevent the necessity for opening the contacts bridging the discharge circuit of the condenser to the direct current bus bar 6 under current after the condenser has been charged. As soon as the relay 47 is energized and the armature thereof is lifted, a potential which is negative with respect to the cathode of the valve 51 is impressed on the grid of the valve from the battery 62 so that the flow of current through the valve is interrupted. All of the contacts of the relay 47 may thus open or close their respective circuits without requiring interruption of any current which simplifies the construction of such relay.

When the system is operating normally, a current will be flowing through the direct current bus bars 6 and 14 and through the valve 8 to maintain an arc within the inverter 12 in such manner that the current is inverted into polyphase alternating current which is transmitted to the alternating current line 16 through the transformer 10, 17. During the time that the system is operating normally, the condenser 45 is charged from the transformer 52 through the load resistance 53 and the valve 51, the grid of which is kept positive from the battery 61 through the current limiting resistance 56. The above actions take place successively regardless of which of the main anodes 11 of the inverter is operating.

When an overload occurs on the system, the coil of the relay 47 is energized and the armature thereof is lifted until the contacts 46 connect the condenser 45 with the direct current bus bar 6. The condenser 45 then discharges thereby forming a short circuit for the valve 8. The arc flowing in the valve 8 is thereby interrupted, as a current of the direct current line will then momentarily flow through the condenser 45, and the valve and the condenser thereafter cooperate to block the flow of direct current in the bus bar 6. Lifting of the armature of the relay 47 also causes contact 48 to close a circuit to the grid of the valve 51 which causes a negative bias to be impressed thereon from the battery 62. Such bias prevents recharging of the condenser 21 until the coil of the relay 47 is again deenergized and the contacts 48 thereof drop a sufficient distance to open the circuit from the battery 62 to the grid of the valve.

If the voltage in the alternating current line drops as the result of a short circuit thereon, the voltage impressed on the grids 35 will also drop, due to the inductive connection thereof through the current transformers 37 and the potential transformer 40, until the secondary voltage of the transformer 40 drops below the value of the direct voltage at the top of the resistance 42. The valves 41 then cease to operate and the grids 35 of the inverter fail to receive any positive voltage impulses from the transformers 37 so that a potential negative with respect to the potential of the cathode is impressed thereon from the cathode 13 of the inverter through the reactance 31 and the resistance 30. If the condenser 45 is now discharged, thereby interrupting the arc flowing within the inverter 12, all of the grids 35 being negatively biased, none of the anodes 11 of the inverter are able to pick up the arc from the excitation anodes 21 and 22 until the voltage of the alternating current line 16 is reestablished by suitable means to a value raising the secondary voltage of the transformer 4 above the voltage of the direct current line at the resistance 42.

Fig. 2 illustrates a modification of the system previously disclosed in which the inverting structure is modified by the provision of an auxiliary anode 66 cooperating with an auxiliary cathode 67. Aside from the above difference the inverter is similar to that shown in Fig. 1, the excitation circuit and the grid control circuit being exactly the same in both cases. The auxiliary anode 66 is supplied from a generator 68 connected with the auxiliary cathode 67 in series with a resistance 69.

As illustrated in the drawings, one terminal of the condenser 45 is in permanent connection with the auxiliary cathode 67 and the other terminal thereof connectible with the direct current bus bar 14, through the anode 80 and cathode 82 of an arcing relay, generally indicated by the dotted line rectangular enclosure 74, and through the winding of the relay 71.

As in the embodiment of Fig. 1 of the drawings, the condenser 45 is charged from the alternating current line 16 over a circuit including the secondary winding of the potential transformer 52, triode valve 51 and current limiting resistance 53. The valve 51 is controlled by continuous application of position potential to the grid thereof from the battery 61 to permit flow of current of unidirection therethrough to charge the condenser 45, and by the application of negative potential from the battery 61 through contacts of the relay 71—when energized by discharge of the condenser 45—to prevent flow of current through the valve during periods of operation of the system when charging of the condenser is not desired.

The arcing relay 74 includes, in addition to the anode 80 and cathode 82, an anode 81, a current coil 83 connected in series with the bus bar 14 and a voltage coil 84 connected across the direct current line bus bars 6, 14, through a resistance 86. A direct current generator 72 supplies current through a current limiting resistance 73, to the anode 81 and cathode 82 of the arcing relay 74 for establishing and maintaining a continuous arc between such electrodes.

When the system in operating normally, after ignition of the inverting arc between the anodes 11 and cathode 13, i. e. without overloads or short circuits, current flows through direct current bus bar 6, reactance 7, transformer primary winding 10, anode 11, cathode 13, current coil 83 and bus bar 14 back to the source. The action of the arc in the inverter 12 produces a polyphase alternating current which flows from the transformer secondary winding 17, alternating current line 16, to machine 19 and to points of use.

A single phase current is taken from the line 16 by the transformer 23 and is supplied through resistances 25 and 26 to the excitation anodes 21 and 22 which keep an arc alive within the inverter 12, the midpoint of the secondary winding of transformer 23 being connected with the cathode 13 through the resistance 30 and the reactance 31 which causes the arcs from the two excitation anodes to overlap.

An alternating current is supplied to the transformer 40 from the line 16 and excites the primary windings of the current transformers 37 which are connected through the valves 41 to the resistance 42 connected across the direct current line 6, 14. A positive impulse is thus impressed on grids 35 through resistances 36 for each alternating current cycle. The transformer 52, which is supplied from the alternating current line 16, supplies the valve 51 which causes charging of the condenser 45 for the reason that the grid of the valve 51 is kept positive from the battery 61.

The generator 68 supplies current to auxiliary anode 66 which keeps a cathode spot on the cathode 67 under the influence of the current flowing in the load resistance 69, and the generator 72 causes a flow of current through an arc from the anode 81 to the cathode 82 of the relay 74 and the resistance 73. The arc is kept between the anode 81 and the cathode 82 of the arcing relay by the attractive magnetic action of the voltage coil 84 which overbalances the repulsive effect of the current coil 83.

As soon, however, as an abnormal condition prevails in the system such as to cause a high current and low voltage in the direct current bus bar 14, the effect of the coil 83 overbalances that of the coil 84 and the arc flowing between the anode 81 and the cathode 82 of the arcing relay 74 is blown from the anode 81 to the anode 80. The arc flowing between anodes 11 and cathode 13 of the inverter 12 is shunted by a circuit which permits current to flow from the positive direct current bus bar 6 through the reactance 7, the transformer primary winding 10 and the anode 11 to the cathode 67. The current flows from the cathode 67 to the condenser 45 and over anode 80 and cathode 82 of the arcing relay 74 through the coil of the relay 71, winding 83 of relay 74, bus bar 14 back to the positive direct current bus bar 6. The electron emitting spot on the cathode 13 is thus extinguished.

The coil of relay 71 having been energized, the armature thereof is raised which connects the grid of the valve 51 to the battery 62 from which it is negatively charged. Such charge prevents a flow of current through the circuit of the condenser 45 which would require that relay 71 interrupt a substantial current thereby requiring a more expensive relay than is required when no current need to be interrupted. As soon as the disturbance on the system is cleared thereby permitting the coil 84 to overbalance the coil 83, the coil of relay 71 will be deenergized and the armature of the relay will drop. The negative bias on the grid of the valve 51 will then disappear and the condenser 45 may be recharged from the transformer 52.

Upon completion of the above actions, the paths for the flow of direct current from the direct current line through the inverter will have been interrupted and the inverter must then be restarted by igniting an arc therein in a manner and by means similar to the arc igniting means now employed in the electric current rectifying art for electric power rectifiers of the metal inclosed metallic vapor type.

Although but two embodiments of the present invention have been illustrated and described it will be apparent to those skilled in the art that various changes and modifications may be made therein without departing from the spirit of the invention or the scope of the appended claims.

The invention claimed is:

1. In a system for inverting direct current into alternating current, a direct current supply line, an electric valve of the metal inclosed metallic vapor type connected with said direct current line, an alternating current distribution line, a transformer connecting said valve with said alternating current line, means for maintaining an arc within said valve, a condenser capable of connection with said direct current line to discharge thereinto thereby interrupting the arc within said valve, a relay connected with and operable by the occurrence of over-currents in said direct current line to cause discharging of said condenser, and means controlled by said relay to control and to cause charging of said condenser.

2. In a system for inverting direct current into alternating current, a direct current supply line, an electric valve of the metal inclosed metallic vapor type connected with said direct current line, said valve having main and auxiliary cathodes to maintain a main arc and an auxiliary arc therein, means for maintaining the auxiliary arc within said valve, an alternating current distribution line, a transformer connecting said valve with said alternating current line, means connectible with said valve for causing coalescense of the main arc with the auxiliary arc and for controlling the conductivity of the main arc, and means operable upon the occurrence of disturbances in said direct current line for connecting the first said means with said valve.

3. In a system for inverting direct current into alternating current, a direct current supply line, an electric valve of the metal inclosed metallic vapor type connected with said direct current line, said valve having electrodes to maintain a main arc and an auxiliary arc therein, means for maintaining the auxiliary arc within said valve, an alternating current distribution line, a transformer connecting said valve with said alternating current line, means for causing coalescense of the main arc with the auxiliary arc, a condenser connectible into the circuit of the main arc to cause interruption thereof upon discharge of said condenser, and means for controlling the discharging of said condenser in dependence upon the conditions in said direct current line.

4. In a system for inverting direct current into alternating current, a direct current supply line, an electric valve of the metal inclosed metallic vapor type connected with said direct current line, said valve having electrodes to maintain a main arc and an auxiliary arc therein, means for maintaining the auxiliary arc within said valve, an alternating current distribution line, a transformer connecting said valve with said alternating current line, means for causing coalescense of the main arc with the auxiliary arc, a condenser connectible into the circuit of the main arc to cause interruption thereof upon discharge of said condenser, means for controlling the discharging of said condenser in dependence upon the conditions in said direct current line, and means controlled by the first mentioned said means to control charging of said condenser.

5. In a system of the character described, a direct current supply line, a polyphase alternating current distribution line, a converting device interconnecting said lines, said device having a main cathode and a plurality of main anodes constituting electrodes for establishing and maintaining arcs therebetween operable to transform direct current supplied thereto from said supply line into polyphase alternating current and the supply thereof to said distribution line, an auxiliary cathode and an auxiliary anode constituting electrodes for establishing and maintaining an auxiliary arc within said device, and means operable responsive to and upon the occurrence of a disturbance in either of said lines for establishing an arc for the momentary flow of current in said valve by way of said main cathode operating as an anode and said auxiliary cathode to thereby interrupt flow of current in said supply line by way of said main cathode.

6. In a system of the character described, a direct current supply line, a polyphase alternating current distribution line, an electric current converting device interconnecting said lines, said device having a main cathode and a plurality of main anodes constituting electrodes for establishing and maintaining arcs therebetween operable to transform direct current supplied thereto from said supply line into polyphase alternating current and the supply thereof to said distribution line, an auxiliary cathode and an auxiliary anode constituting electrodes for establishing and maintaining an auxiliary arc within said device, a condenser connectible with said cathodes to discharge thereinto for interrupting the flow of current in said supply line by way of said main cathode, and electromagnetically actuated means operable in dependence upon conditions in said supply line for causing said discharge of said condenser.

7. In a system of the character described, a direct current supply line, a polyphase alternating current distribution line, an electric current converting device connected with said supply line, a transformer connecting said device with said distribution line, said device comprising a main cathode and a plurality of main anodes constituting arcing terminals of said supply line and operable to transform direct current supplied thereto into polyphase alternating current and the supply thereof to said distribution line, an auxiliary anode and an auxiliary cathode constituting electrodes for establishing and maintaining an auxiliary arc within said device, a condenser connectible with said cathodes to discharge therethrough to thereby interrupt the flow of current through said supply line by way of said main cathode, electromagnetically actuated means connected with and operable responsive to over-currents in said supply line for causing said discharge of said condenser, and means controlled by said electromagnetically actuated means operable to control and to cause charging of said condenser.

8. In a system of the character described, a direct current supply line, an alternating current distribution line, an electric current converting device connected with said supply line, a transformer connecting said device with said distribution line, said device comprising a main cathode and a plurality of main anodes constituting arcing terminals of said supply line and operable to convert direct current supplied thereto into alternating current and the supply thereof through said transformer to said distribution line, an auxiliary cathode and an auxiliary anode contained within said device constituting electrodes for establishing and maintaining an auxiliary arc within said device, a condenser connectible with said cathodes for discharge therethrough to establish a supplemental arc therebetween operable to thereby prevent flow of current in said supply line by way of said main cathode and to cause momentary flow of current in said supply line by way of said auxiliary cathode and said main anodes, the path for the flow of current in said supply line by way of said auxiliary cathode including said condenser and the discharge thereof being operable to prevent flow of current in said supply line by way of said device.

9. In a system of the character described, a direct current supply line, an alternating current distribution line, an electric current converting device connected with said supply line, a transformer connecting said distribution line with said device, said device comprising a main cathode and a plurality of main anodes constituting arcing terminals of said supply line and operable to convert direct current supplied thereto into alternating current and the supply thereof through said transformer to said distribution line, an auxiliary cathode and an auxiliary anode contained within said device constituting electrodes for establishing and maintaining an auxiliary arc within said device, a source of current supply for the last said electrodes, a condenser connectible with said cathodes for discharge therethrough to establish a supplemental arc between said main cathode operating as an anode and said auxiliary cathode to thereby interrupt flow of current in said supply line by way of said main cathode, means connected with said distribution line and supplied with alternating current therefrom to control and to cause charging of said condenser, an arcing relay having a cathode and a plurality of anodes, means for maintaining an arc between one of said anodes and the cathode of said relay, said relay including means operable in dependence upon the ratio of the voltage to the current of said supply line for causing the last said arc to flow by way of another anode of said relay to establish thereby circuit for discharge of said condenser by way of said main and auxiliary cathodes, and a relay included in the said discharge circuit for said condenser and operable responsive to discharge thereof for controlling the said means for controlling and charging thereof.

10. In a system of the character described, in combination with a direct current supply line, an alternating current distribution line, and an electric current converting device interconnecting said lines and operable to convert direct current supplied thereto from said supply line into alternating current and the supply thereof to said distribution line, of an asymmetrical valve of the metallic vapor arcing type serially connected in circuit with said supply line controlling the operative connection thereof with said device, a condenser connectible with said supply line for discharge through said valve, means connected with and supplied with alternating current from said distribution line for charging said condenser, means operable upon the occurrence of a disturbance in said system for causing discharge of said condenser through said valve to thereby prevent the flow of current in said supply line to and through said device.

11. In a system of the character described, in combination with a direct current supply line, an alternating current distribution line, and an electric current converting device interconnecting said lines operable to convert direct current supplied thereto by said supply line into alternating current and the supply thereof to said distribution line, of an asymmetrical valve of the metallic vapor arcing type serially connected in circuit with said supply line operable to control the flow of current therethrough to said device, a condenser connectible with said supply line for discharge through said valve, means connected with and supplied with alternating current from said distribution line for charging said condenser, and a relay connected with said supply line operable responsive to flow of over-currents therein to cause discharge of said condenser through said valve, the said relay controlling said means.

12. In a system of the character described, in combination with a direct current supply line, an alternating current distribution line, and an electric current converting device interconnecting said lines operable to convert direct current supplied thereto by said supply line into alternating current and the supply thereof to said distributing line, of an asymmetrical electric valve of the metallic vapor arcing type serially connected in circuit with said supply line operable to control the flow of current therethrough to said device, a condenser connectible with said supply line for discharge through said valve, an auxiliary converting device inductively connected with said distribution line and conductively connected with said condenser operable to convert alternating current supplied thereto from said distribution line into direct current and the supply thereof to said condenser to charge the latter, and relay means connected with said supply line operable upon the occurrence of a disturbance in either of said lines to cause discharge of said condenser through said valve to interrupt flow of current to said converting device and to prevent current converting operation of said auxiliary device.

13. In a system of the character described, in combination with a direct current supply line, an alternating current distribution line, and means comprising an electric current converting device interconnecting said lines operable to convert current received from said supply line into alternating current and the supply thereof to said distribution line, of means comprising a condenser for controlling said converting operation of said device and the supply of current from said supply line to said distribution line, means operable responsive to and upon the occurrence of flow of abnormal current in said direct current line for causing discharge of said condenser through the first said means to thereby interrupt the said converting operation of said device and the supply of current from said supply line to said distribution line by way of said device, and means comprising an electric valve for charging said condenser.

14. In a system of the character described, in combination with a direct current supply line, an alternating current distribution line, and means comprising an electric current converting device interconnecting said lines and operable to convert direct current received from said supply line into alternating current and the supply thereof to said distribution line, of means comprising a condenser for controlling said converting operation of said device and the supply of current from said supply line to said distribution line, relay means operable responsive to the flow of abnormal current in said supply line to said device for causing discharge of said condenser through the first said means to thereby interrupt the said converting operation of said device and the supply of current from said supply line to said distribution line by way of said device, and means for charging said condenser.

GUSTAV BRUNNER.